United States Patent [19]

Haas

[11] 4,291,367

[45] Sep. 22, 1981

[54] POWER SUPPLY CIRCUIT WITH A SELF-OSCILLATING BLOCKING OSCILLATOR

[75] Inventor: Roman Haas, Munich, Fed. Rep. of Germany

[73] Assignee: Siemens Aktiengesellschaft, Berlin & Munich, Fed. Rep. of Germany

[21] Appl. No.: 93,674

[22] Filed: Nov. 13, 1979

[30] Foreign Application Priority Data

Nov. 15, 1978 [DE] Fed. Rep. of Germany ....... 2849619

[51] Int. Cl.³ ......................................... H02M 3/335
[52] U.S. Cl. ................................................. 363/21
[58] Field of Search ................... 331/112; 363/20, 21, 363/97

[56] References Cited

U.S. PATENT DOCUMENTS

3,573,596 4/1971 Kamil .................................... 363/20
4,037,271 7/1977 Keller .................................... 363/21

FOREIGN PATENT DOCUMENTS

2160659 2/1976 Fed. Rep. of Germany .

Primary Examiner—William M. Shoop
Attorney, Agent, or Firm—Hill, Van Santen, Steadman, Chiara & Simpson

[57] ABSTRACT

A power supply circuit is disclosed with a self-oscillating blocking oscillator. A switching transistor and a transformer connecting to a supply voltage produce a DC output voltage which can be obtained from the transformer via a rectifier arrangement. A regulating circuit in a control circuit of the switching transistor is provided which controls the switching transistor as a function of a comparison voltage which is drawn from a primary circuit of the transformer. An integration member connected parallel to the supply voltage produces a periodic, sawtooth-shaped signal which corresponds to the current in the primary circuit and with which the regulating circuit is driven so as to trigger the switching transistor.

4 Claims, 5 Drawing Figures

POWER SUPPLY CIRCUIT WITH A SELF-OSCILLATING BLOCKING OSCILLATOR

BACKGROUND OF THE INVENTION

The present invention concerns a power supply circuit with a self-oscillating blocking oscillator, which, with the help of a switching transistor and a transformer, produces a DC voltage which can be taken from the transformer via a rectifier arrangement from the DC which is fed to the blocking oscillator. A regulating circuit is also provided in the control circuit of the switching transistor which controls the switching transistor as a function of a comparison voltage which is drawn from the primary circuit of the transformer.

Power supply circuits of this type are, for example, known from German Pat. No 2,160,659 incorporated herein by reference. In the case of such known power supply circuits, the drive signal for the regulating circuit which triggers the switching transistor is created by means of a resistor in the emitter circuit of the switching transistor. In the case of a design of this sort, nevertheless the disadvantage occurs that in the case of a failure of the switching transistor, the complete rectified supply voltage occurs at the emitter resistor, so that the drive circuit can be destroyed. Further, the voltage at this emitter resistor is also burdened with overshoot components, so that hunting arises.

SUMMARY OF THE INVENTION

It is an object of the present invention to provide for a collector current simulation of the switching transistor which does not have the disadvantages mentioned above.

This problem is solved according to the invention in the case of a power supply circuit of the type discussed above by means of an integration member which is parallel to the supply or input DC voltage and which produces a periodic sawtooth-shaped signal which corresponds to the current in the primary circuit and with which the regulating circuit is driven for triggering of the switching transistor.

DESCRIPTION OF THE PREFERRED EMBODIMENTS

Figure 1:
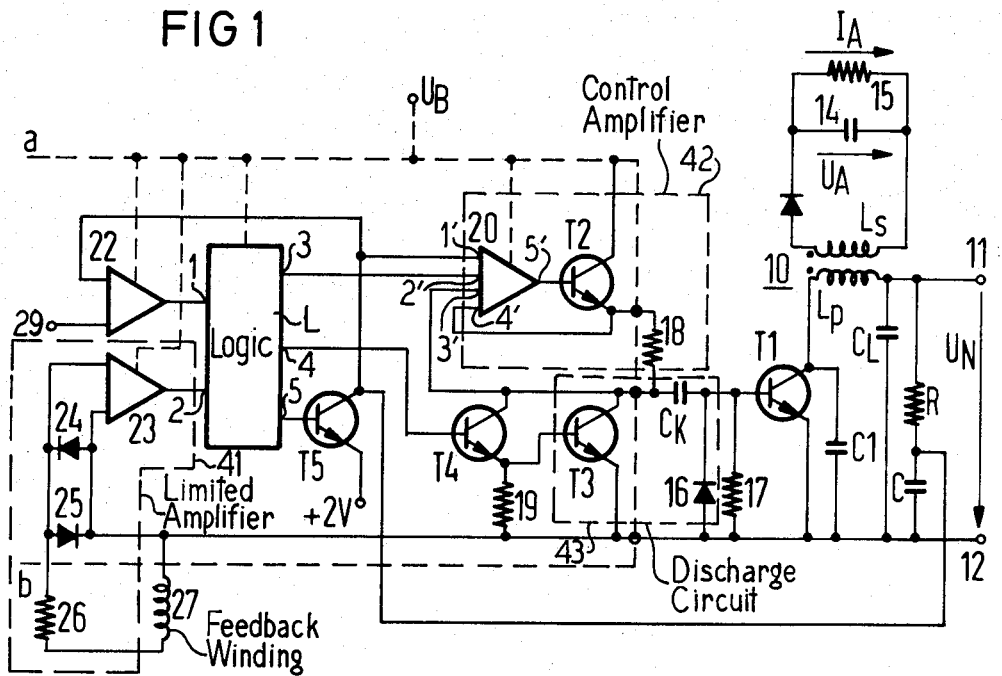
FIG. 1 shows an embodiment of a power supply circuit according to the invention with a portion of a regulating circuit preferably embodied in integrated techniques.

According to FIG. 1, a rectified supply voltage $U_N$ is fed to the power supply circuit according to the invention at terminals 11 and 12. The power supply circuit contains a transformer 10 with a primary winding $L_p$ and a secondary winding $L_s$. In the circuit of the primary winding $L_p$ there is a switching transistor $T_1$ whose collector-emitter path has a capacitor $C_1$ connected in parallel therewith as well as a by-pass capacitor $C_L$. In the secondary circuit of the transformer 10 at the secondary winding $L_s$ a load 15 represented schematically by a resistor and a capacitor 14 in parallel therewith are connected via a rectifier 13 to winding $L_s$. The winding direction of primary winding $L_p$ and secondary winding $L_s$ is indicated by dots at these windings.

For the simulation, or respectively, measurement of the collector current of the switching transistor $T_1$, parallel to the terminals 11 and 12 at which the supply or input DC voltage $U_N$ is fed in there is an integration member in the form of a RC member with resistor R and capacitor C. At this RC member there arises a periodic sawtoothed-shaped signal which corresponds to the current in the primary circuit and thus to the collector current of the switching transistor $T_1$. With this periodic sawtooth-shaped signal, a regulating circuit is driven which triggers the switching transistor $T_1$. This regulating circuit is constructed according to FIGS. 1 and 2 by means of the circuit portion framed with a dot-dash line. The connection of the two circuit portions is indicated by means of the reference symbols a and b at the dot-dash line frame. The switching transistor $T_1$ is driven by the regulating circuit via coupling capacitor $C_k$ as well as the parallel circuit of a diode 16 and a resistor 17. Transistor $T_3$, capacitor $C_k$, and diode 16 form a discharge circuit block 43 for keeping constant an average DC voltage at the coupling capacitor during a blocking phase of the switching transistor $T_1$. With a resistor 18, negative feedback current which is explained hereafter is provided.

The regulating circuit contains a logic 21 which selects an operational amplifier 20 as well as a transistor combination $T_3$, $T_4$ and an emitter resistor 19 for the transistor $T_4$. Further negative feedbacks are provided for operational amplifier 20. These feedbacks are coupled via transistor $T_2$ and the negative current feedback resistor 18, already mentioned, to further inputs of the operational amplifier 20. Amplifier 20, transistor $T_2$, and resistor 18 form a control amplifier block 42 for converting the sawtooth-shaped signal into a proportional current. Logic 21 further selects a transistor $T_5$ which has its emitter at a voltage of +2 volts and the collector of which is connected at the connection point of the RC member so as to measure the collector current of the switching transistor $T_1$. Further, the collector of the transistor $T_5$ is coupled at an input of an operational amplifier 22 as well as a further input of the operational amplifier 20. The operational amplifier 22 receives a trigger signal from the circuit portion according to FIG. 2 via a terminal 29 at a further input, and with its output drives the logic 21. A further operational amplifier 23, which drives the logic 21, is driven via a feedback winding 27 of the transformer 10 and a resistor 26, as well as oppositely polarized parallel connected protective diodes 24 and 25 at its two inputs. Amplifier 23, diodes 24 and 25, and resistor 26 form a limiter amplifier block 41 for the production of a signal with two pre-determined levels which correspond to zero passages of the feedback signal. The voltage supplies of the regulating circuit are represented schematically with a broken line by a terminal which is designated $U_B$.

Figure 2:
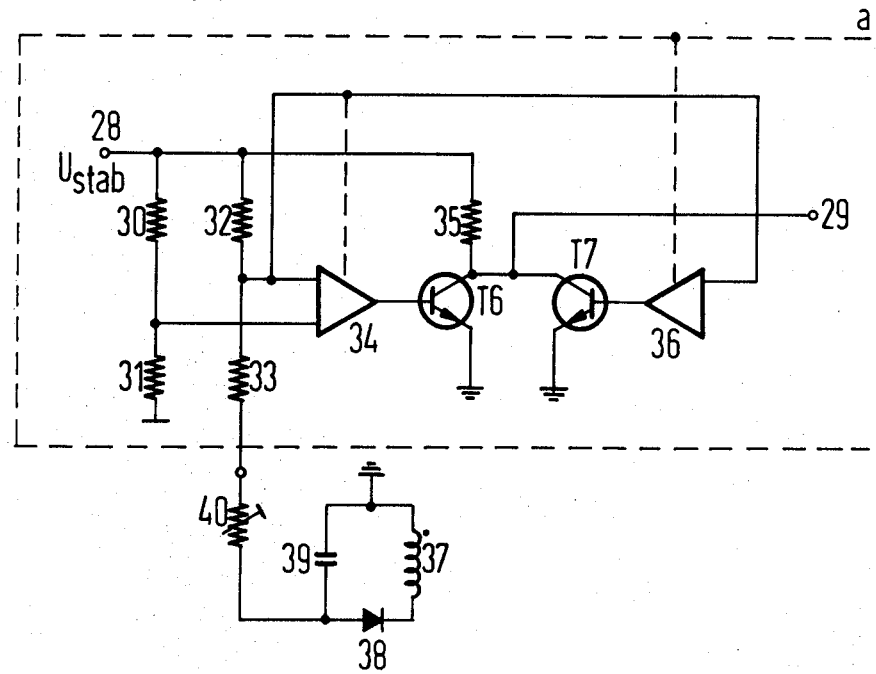
FIG. 2 shows a further portion of the regulating circuit which is preferably designed in integrated techniques.

The further circuit portion of the regulating circuit of FIG. 1 shown in FIG. 2 produces the trigger signal at terminal 29 out of a stabilized voltage $U_{stab}$ at terminal 28. In this circuit portion an operational amplifier 34 is driven via a winding 37 of the transformer 10, the winding direction of which is indicated with a dot, and which is connected with a capacitor 39 and a diode 38 via a voltage divider with resistors 32, 33 and an adjustable resistor 40 at an input. A further input of the operational amplifier 34 is at terminal 28 via a voltage divider formed of resistors 30 and 31. The operational amplifier 34 controls a transistor combination $T_6$, $T_7$, the collectors of which are connected together and are coupled to terminal 28 via a resistor 35. Further, the collectors of transistors $T_6$ and $T_7$ which are connected with one another form terminal 29. A further operational amplifier 36 has its input at the junction of the resistors 32 and 33 and with its output controls transistor $T_7$.

Figure 3:
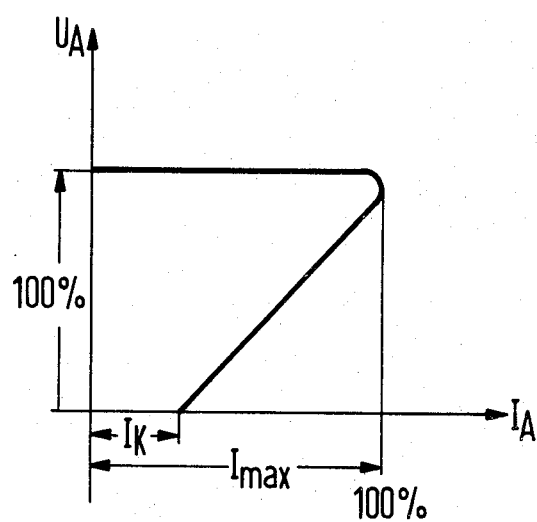
FIG. 3 shows a diagram of the relationship between the output voltage and the output current of the power supply circuit.
Figure 4:
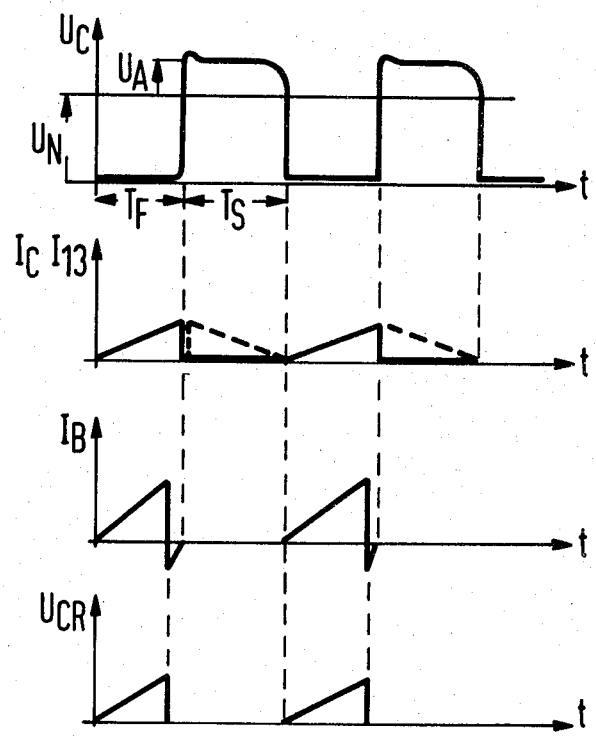
FIG. 4 shows time diagrams of the collector voltage, collector current and base current of the switching transistor, of the current which flows via a rectifier in the initial output circuit of the power supply circuit, as well as the voltage at an RC combination which simulates the collector current of the switching transistor.
Figure 5:
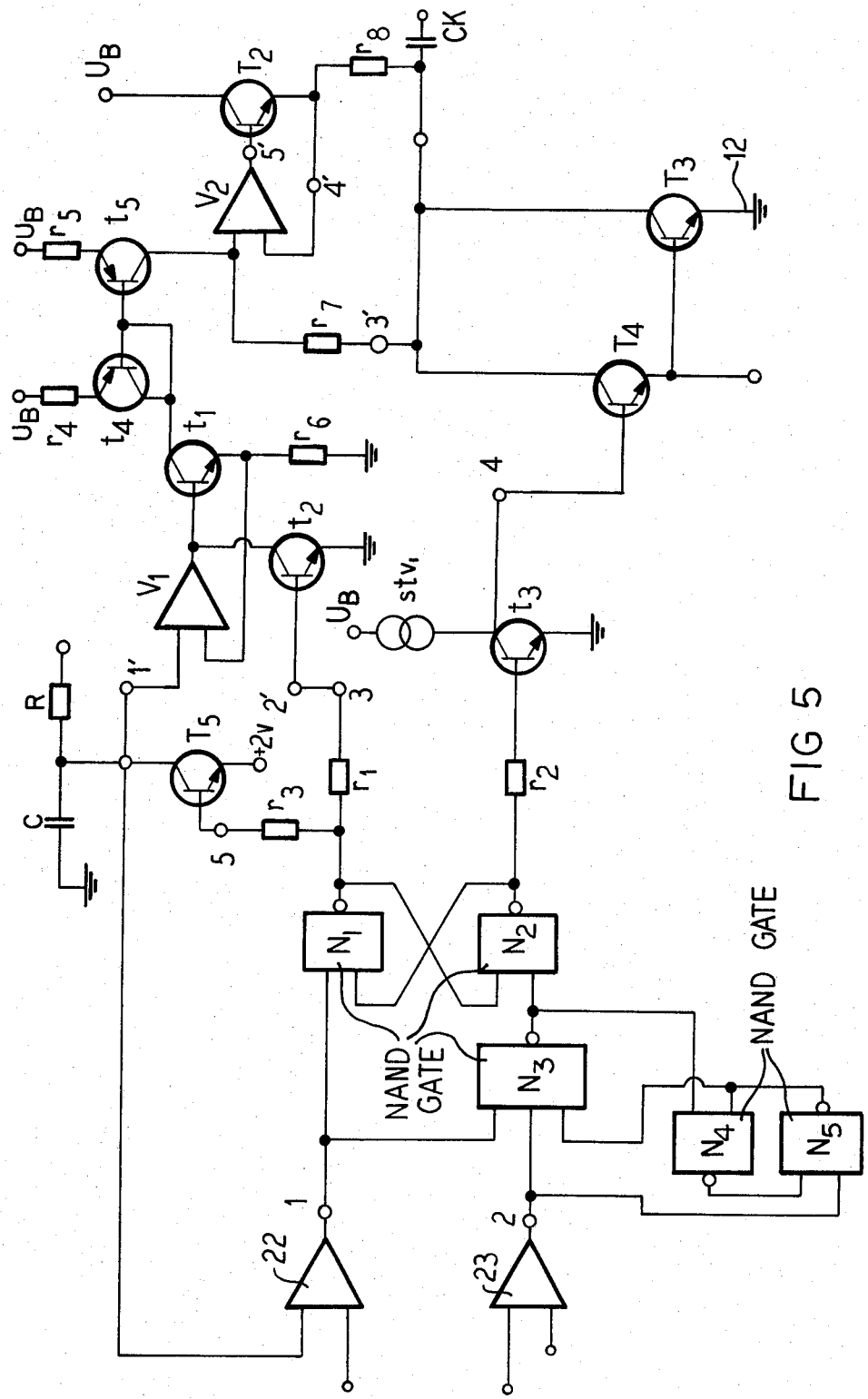
FIG. 5 is a diagram of the logic L and amplifier 20 of FIG. 1.

In the diagram according to FIG. 3, the variation of the output voltage $U_A$ relative to the output current $I_A$ is represented. According to this, in the case of 100% of the output voltage $U_A$, the maximum output current $I_{Amax}$ of 100% flows, as well as in the case of an output voltage $U_A$ with value zero, a short circuit current $I_K$ flows. In the diagram according to FIG. 4, in the upper portion, the collector voltage $U_C$ of the switching transistor $T_1$ is represented as a function of time, whereby, from this diagram, the voltage variation during the on periods $T_F$ and the off periods $T_S$ can be seen. In a diagram located under this curve the variation of the collector current $I_C$ is represented as a solid line curve and the variation of a current $I_{13}$ which flows in the output circuit via the rectifier 13 is represented by means of a broken line curve as a function of time. A further diagram shows the variation of the base current $I_B$ of the switching transistor $T_1$ as a function of time. Finally, a further diagram shows the variation of voltage $U_{RC}$ at the RC member which simulates the collector current of the switching transistor $T_1$.

The functioning of the power supply circuit with a self-oscillating blocking oscillator according to the invention in principle corresponds to that of the power supply circuit according to the above-mentioned German Pat. No. 2,160,659. In contrast to this known power supply circuit, nevertheless, new driving principles are realized in the case of the power supply circuit according to the invention. For satisfactory functioning, for the drive of the switching transistor $T_1$ different signals are necessary. Specifically, the following signals: first, a switch-on release may only proceed if the voltage $U_C$ at the transistor $T_1$ is equal or smaller than the supply voltage $U_N$. Secondly, switch-on may only occur in the case of the indirect measurement of the collector current of the switching transistor $T_1$ by means of the RC member if the current $I_{13}$ which flows via the rectifier 13 is equal to zero. The residual energy in the primary winding $L_p$ cannot be recognized by the RC member, whereby a particular danger arises in the case of short circuit at the output represented by the resistor 15. The two previously mentioned conditions are attained by means of the feedback network with the resistor 26, the winding 27, the diodes 24 and 25 as well as the operational amplifier 23. The feedback voltage which is supplied by the winding 27 is amplified by the operational amplifier 23 and is available at its output as a square wave voltage. The diodes 24 and 25 form protective diodes for the operational amplifier 23. AC voltages of approximately 0.7 volts (a diode threshold) must be recognized as a square wave voltage at the secondary winding $L_s$ at the output of the operational amplifier 23.

As a switch-off condition, with the attainment of the maximum admissible collector current $I_C$ of the switching transistor $T_1$, switch-off must occur. A premature switch-off is necessary if the output load which is given by the resistor 15 decreases or if the rectified supply voltage $U_N$ rises. This means that the voltage $U_A$ at the capacitor 14 must be kept constant. At capacitor 39 a voltage which is proportional to this voltage arises and which is compared at the input of the operational amplifier 34 with the stabilized voltage $U_{stab}$ at terminal 29. Accordingly, via the transistor $T_6$ and the and the resistor 35, the trigger signal arises at terminal 29. The maximum trigger level amounts to $U_{stab}$. This level may be reduced via the transistor $T_7$. This transistor $T_7$ is driven via the operational amplifier 36 which receives information about the voltage at the capacitor 39 via its input.

In the case of nominal voltage at the capacitor 14, or respectively, at the capacitor 39, the transistor $T_7$ is blocked, so that the maximum trigger level $+U_{stab}$ can occur. If the voltage at the capacitor 39 is smaller, then also the maximum trigger level is correspondingly reduced. With this, a receding overload characteristic according to FIG. 3 is attainable, that is, the short circuit current $I_k$ is smaller than $I_{Amax}$.

The switch-off point in time is determined by the comparison of the trigger signal at point 29 and the sawtooth voltage at the input of the operational amplifier 22. This information is fed to the logic 21. The voltage $U_{RC}$ corresponds in its time-related variation to the collector current through the switching transistor $T_1$. During the off period $T_S$ (FIG. 4), voltage $U_{RT}$ is established by means of transistor $T_5$ at +2 volts. Transistor $T_5$ is blocked during the on period $T_F$, so that voltage $U_{RC}$ can rise in a sawtooth shape.

Further, voltage $U_{RC}$ is used for the positive base current formation. This proceeds via an operational amplifier 20 and the transistor $T_2$, whereby a negative feedback current is achieved with the resistor 18. The value of resistor 18 influences the relationship of the base current and the collector current, whereby the base current $I_B$ is proportional to the product of $R_{18}$ and $I_C$. With this, the momentary value of the base current during the on period $T_F$ is proportional to the momentary value of the collector current, whereby an optimum drive results. During the off period $T_S$, the operational amplifier 20 and the transistor $T_2$ are blocked by the logic 21, while the transistors $T_4$ and $T_3$ are switched on so as to switch off the switching transistor $T_1$. Accordingly, current from the base of transistor $T_1$ flows via the coupling capacitor $C_K$ and the transistor $T_3$ toward ground. Further, the residual compensating charge flows via the diode 16, the coupling capacitor $C_K$, and the transistor $T_3$.

The circuitry for the logic L and the operational amplifier 20 is shown in FIG. 3. Corresponding connection points 1–5 and 1'–5' are shown. The output of the differential amplifier 22 from FIG. 1 lies at an input of a NAND gate N1 which, together with a second NAND gate N2, forms an RS flip-flop as a result of cross-coupling, i.e., connection of the second input of each of the two gates N1 and N2 with the signal output of the respectively other NAND gate.

The third NAND gate N3 has three signal inputs of which the first is driven by means of the output of the initially cited differential amplifier 22, the second is driven by means of the output of the further differential amplifier 23 likewise illustrated in FIG. 1, and the third is driven by means of the signal output of a fifth NAND gate N5.

Together with a fourth NAND gate N4, the fifth NAND gate N5 likewise forms a flip-flop, in that the output of the fourth NAND gate N4 lies at the second input of the fifth NAND gate N5, the output of the fifth NAND gate N5 lies at the one input of the fourth NAND gate, whereas the other input of N5 (as already pointed out) is charged by the differential amplifier 23 and the other input of N4 is charged by means of the output of the third NAND gate N3. It should also be pointed out that the input of the fourth NAND gate N4 which is connected to the output of the fifth NAND gate N5 lies at the third input of the third NAND gate N3 together with this output.

For driving the base of transistor T5 (from FIG. 1), the output of the first NAND gate N1 is connected via a resistor r3 to the base terminal of this transistor T5. Moreover, the output of the first NAND gate N1 connects via a further resistor r1 to the base of a NPN transistor t2 whose emitter is at reference potential (ground) and whose collector is connected to the output of a differential amplifier V1 which is part of the operational amplifier 20. The signal input of this differential amplifier V1 is at the collector of the aforementioned transistor T5, whereas its reference input is controlled via a further NPN transistor t1 by means of the output of this amplifier V1. To this end, the emitter of this NPN transistor t1 lies at the said reference input and also at reference potential via a resistor r6, whereas the collector is supplied with operating voltage at operating potential UB which is positive in comparison to the reference potential. To this end, two PNP transistors t4 and t5 are provided, whose emitter terminals are connected via a respective resistor r4 or, respectively, r5 to the operating potential UB. Their base terminals are connected to one another, and, to the collector of one of these two transistors, namely, of transistor t4. The bases also connect to the collector of transistor t1.

The collector of transistor T5 as can be seen from FIG. 1, is connected to one input of the differential amplifier 22 and, moreover, to the divider point between the capacitor C (likewise illustrated in FIG. 1) and the resistor R.

The output of the NAND gate N2 of logic 21 is connected via resistor r2 to the base of an NPN transistor t3 whose emitter lies in the emitter circuit at reference potential and whose collector lies at the other operating potential UB via a transistor or, respectively, transistor combination wired as a constant current source Str. Moreover, the collector of this transistor t3 is connected to the base of a further NPN transistor T4 (already illustrated in FIG. 1). Capacitor CK and the NPN transistor T3 as well as the resistor 18 are likewise illustrated in FIG. 1.

The collector of transistor T4 and the collector of the NPN transistor T3 are applied via resistor r7 to the signal input of a further differential amplifier V2 whose output serves for driving the base of the NPN transistor T2 (also illustrated in FIG. 1). The signal input of the amplifier V2, moreover, is connected to the collector of the PNP transistor t5 of the constant current source formed from the two transistors t4 and t5.

The reference input of the second differential amplifier V2 is applied together with the emitter of the NPN transistor T2 to the capacitor CK via the resistor 18.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A self-sustaining blocking oscillator power supply circuit, comprising: a primary circuit formed of a DC supply voltage connected to a switching transistor through a primary of a transformer; rectifying means connected to a secondary of the transformer for producing a DC output voltage; regulating circuit means connecting to a control input of the switching transistor for controlling the switching transistor as a function of a comparison voltage derived from the primary circuit; an integration means connected parallel to the DC supply voltage for producing a periodic, approximately sawtooth-shaped signal which substantially corresponds to a current flowing in the primary circuit at the primary of the transformer, the sawtooth-shaped signal driving the regulating circuit means for triggering of the switching transistor; and the integration means comprising an RC member connected to be discharged via a switch means for synchronous operation with the switching transistor.

2. A self-sustaining blocking oscillator power supply circuit, comprising: a primary circuit formed of a DC voltage connected to a switching transistor through a primary of a transformer; rectifying means connected to a secondary of the transformer for producing a DC output voltage; regulating circuit means connecting to a control input of the switching transistor for controlling the switching transistor as a function of a comparison voltage derived from the primary circuit; an integration means connected parallel to the DC supply voltage for producing a periodic, approximately sawtooth-shaped signal which substantially corresponds to a current flowing in the primary circuit at the primary of the transformer, the sawtooth-shaped signal driving the regulating circuit means for triggering of the switching transistor; and a control means coupled to the switching transistor for converting said periodic sawtooth-shaped signal into a proportional current, an output current of said control amplifier means driving the switching transistor during its on time.

3. A power supply circuit according to claim 2 wherein said control amplifier means drives the switching transistor during its on time is coupled via a coupling capacitor to the switching transistor, said coupling capacitor forming a portion of a discharge circuit means for keeping constant during a blocking phase of the switching transistor an average DC voltage at the coupling capacitor.

4. A self-sustaining blocking oscillator power supply circuit, comprising: a primary circuit formed of a DC supply voltage connected to a switching transistor through a primary of a transformer; rectifying means connected to a secondary of the transformer for producing a DC output voltage; regulating circuit means connecting to a control input of the switching transistor for controlling the switching transistor as a function of a comparison voltage derived from the primary circuit; an integration means connected parallel to the DC supply voltage for producing a periodic, approximately sawtooth-shaped signal which substantially corresponds to a current flowing in the primary circuit at the primary of the transformer, the sawtooth-shaped signal driving the regulating circuit means for triggering of the switching transistor; the transformer having a feedback winding for production of a feedback means signal proportional to a signal in the primary winding; and a limiter amplifier means driven by the feedback signal for the production of a signal with two predetermined levels which correspond in each case to zero passages of the feedback signal which go positive or negative.

* * * * *